United States Patent
Ide et al.

(10) Patent No.: US 7,832,102 B2
(45) Date of Patent: Nov. 16, 2010

(54) LINK ROD MANUFACTURING METHOD

(75) Inventors: Takanobu Ide, Fujimino (JP); Yasuhiro Shimada, Fujimino (JP)

(73) Assignee: Yamashita Rubber Kabushiki Kaisha, Fujimino-shi, Saitama (JP)

( * ) Notice: Subject to any disclaimer, the term of this patent is extended or adjusted under 35 U.S.C. 154(b) by 901 days.

(21) Appl. No.: 11/693,233

(22) Filed: Mar. 29, 2007

(65) Prior Publication Data

US 2007/0180698 A1   Aug. 9, 2007

(51) Int. Cl.
 *B21C 23/00* (2006.01)
 *B21D 28/00* (2006.01)
 *B21D 53/78* (2006.01)
 *B23K 20/12* (2006.01)

(52) U.S. Cl. .......................... 29/897.2; 29/412; 29/415; 29/428; 72/253.1; 72/255; 72/338; 228/2.1; 228/2.3; 280/124.134

(58) Field of Classification Search ................ 29/412, 29/415, 428, 888.09, 897, 897.2; 72/31.13, 72/253.1, 254, 255, 338; 228/2.1, 2.3; 267/188; 280/124.135, 124.152, 124.153, 124.134
See application file for complete search history.

(56) References Cited

U.S. PATENT DOCUMENTS 3,144,709 A * 8/1964 Hansson et al. .............. 29/413

2008/0235946 A1 * 10/2008 Ide et al. .................. 29/888.09

FOREIGN PATENT DOCUMENTS

| JP | 11-099415 | 4/1999 |
| JP | 11-101286 | 4/1999 |
| JP | 11-190375 | 7/1999 |
| JP | 2006-136942 | 6/2006 |
| JP | 2006-136943 | 6/2006 |

* cited by examiner

*Primary Examiner*—David P Bryant
*Assistant Examiner*—Alexander P Taousakis
(74) *Attorney, Agent, or Firm*—Rankin, Hill & Clark LLP

(57) ABSTRACT

In a link rod manufacturing method, a bracket material (14) having a ring portion and a mounting projection (15) is made by extrusion molding a material at the length corresponding to a plurality of brackets. On a forward end of the mounting projection (15), an engaging projection (17) with upper and lower steps (7a, 7a) is formed. An arm (2) is made by extrusion molding and regular-size cutting a material in a substantially I-shaped configuration which has a pair of first and second walls (20, 21) parallel extending on upper and lower sides and a third wall (22) crossing at a right angle and connecting these walls. A notch (23) is formed on an end of the third wall (22). When the engaging projection (17) is engaged with the notch (23), each of ends of the first and second walls (20, 21) on the side of ends 2a of the arm 2 is fitted onto the step (7a, 7a) and butted against a vertical wall (17b). Surfaces in the vicinity of butted portions (6) formed in this way forms a plane tool traveling surface and are supported on the insides thereof by the engaging projection (17) to prevent deformation. Therefore, the friction stir welding is carried out along the butt portion (6).

6 Claims, 13 Drawing Sheets

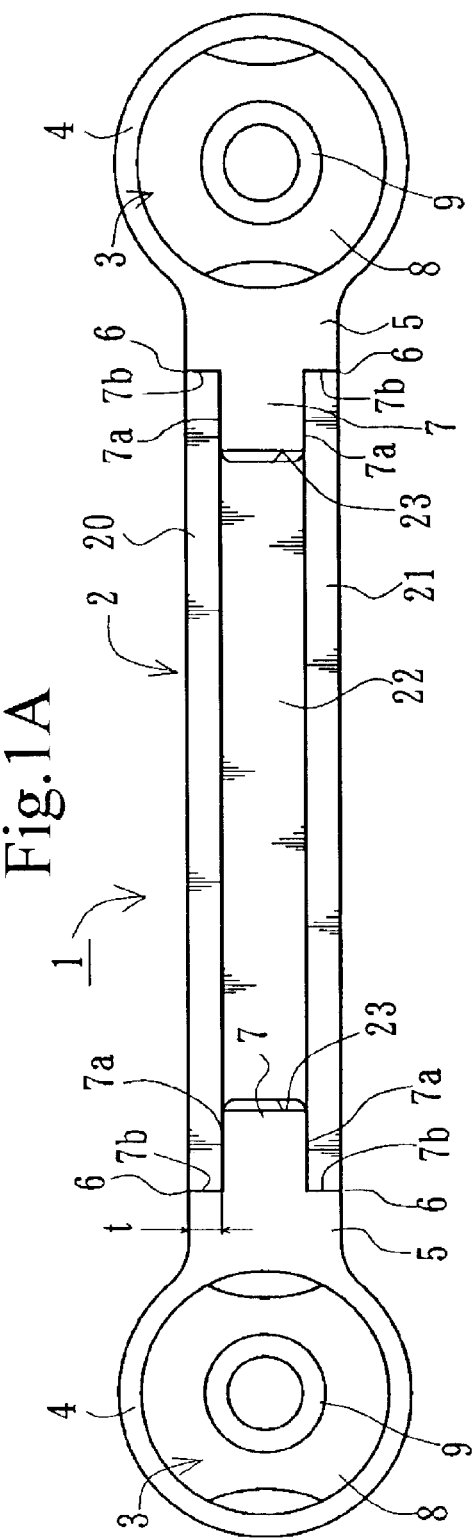
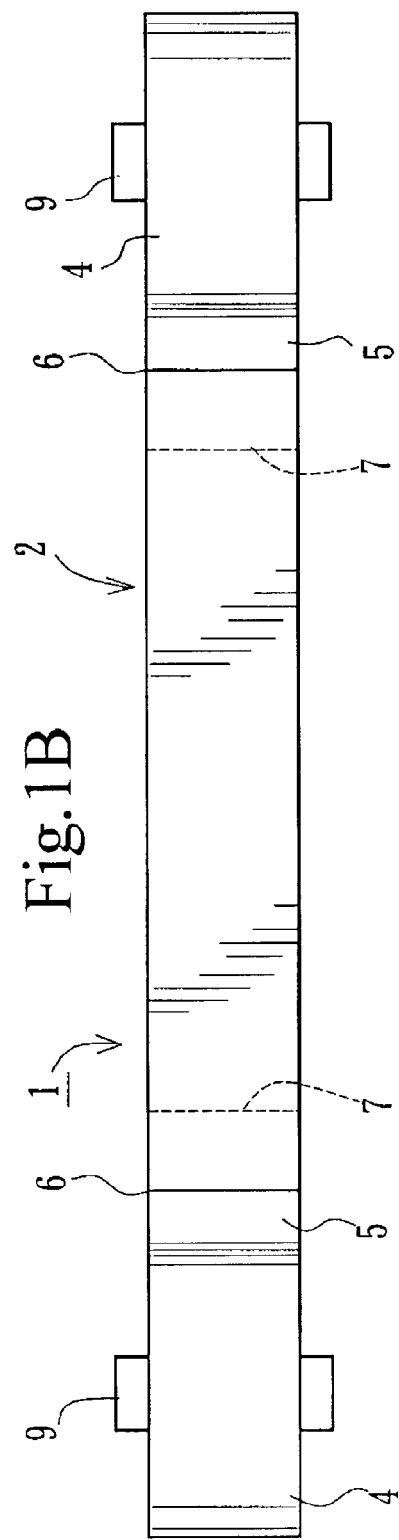

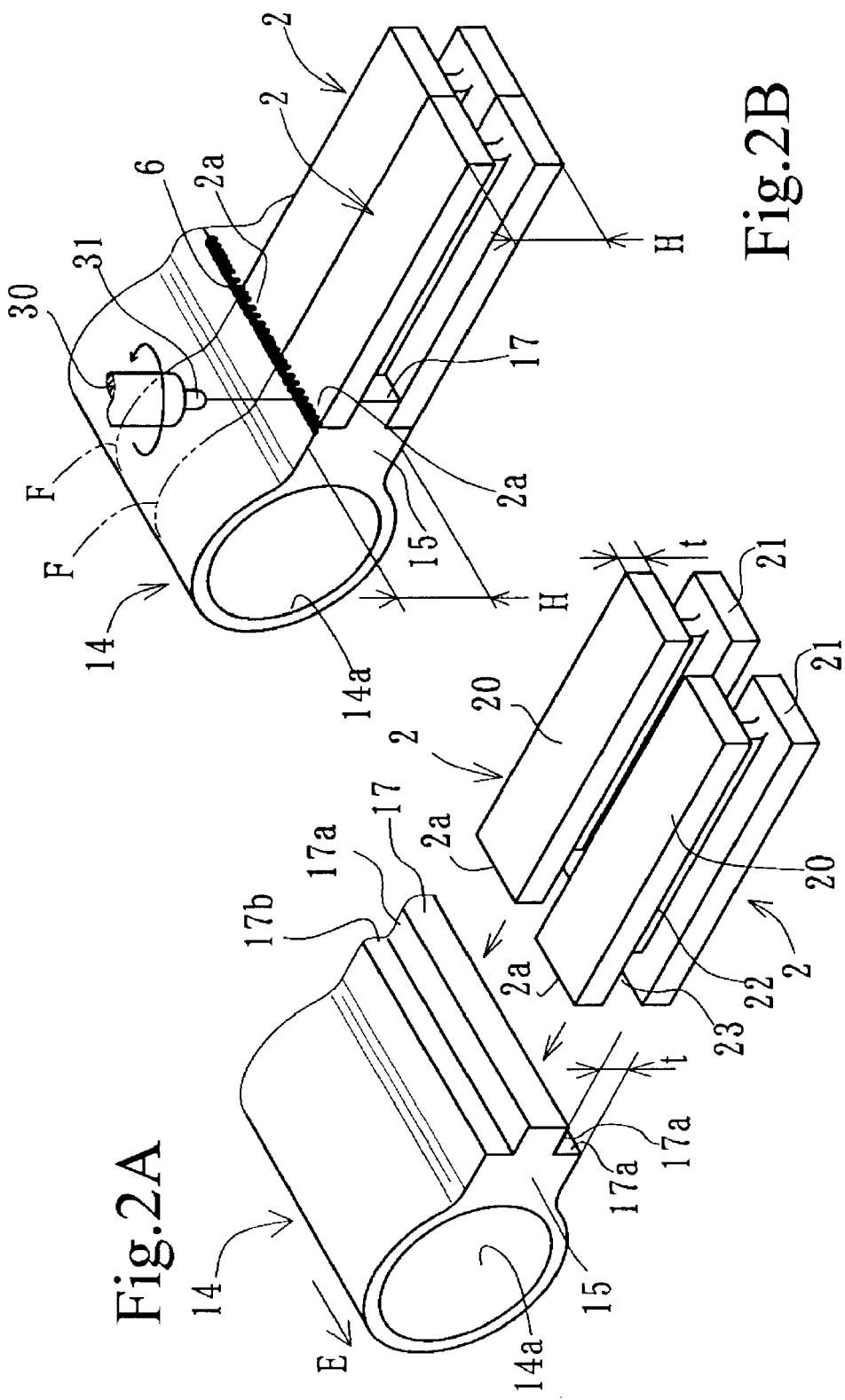

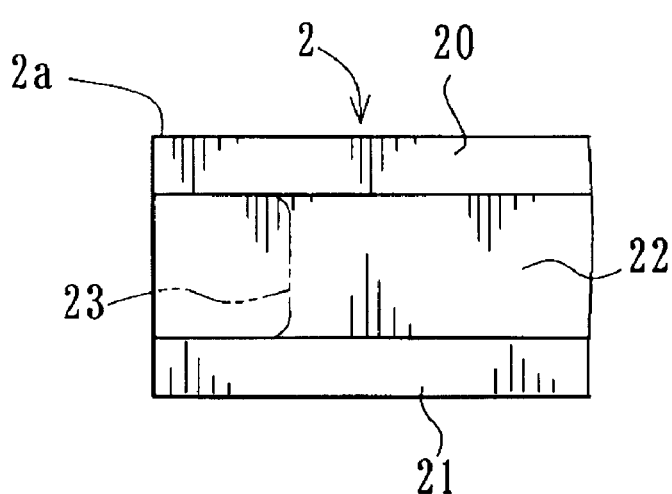
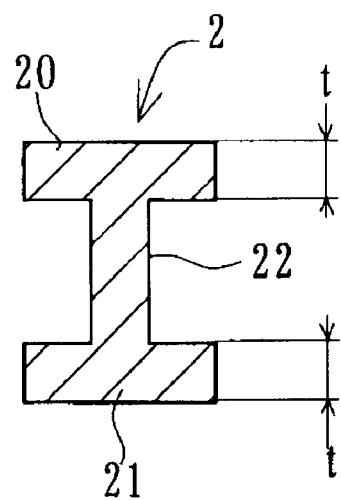
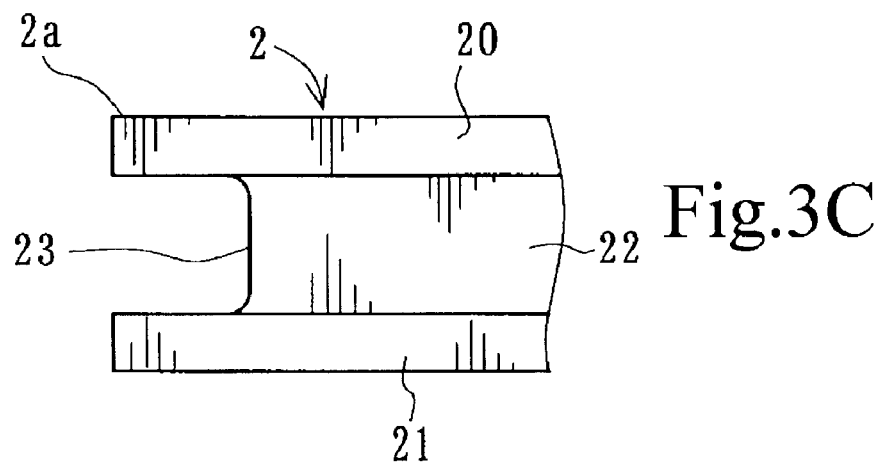

LINK ROD MANUFACTURING METHOD

BACKGROUND OF THE INVENTION

1. Field of the Invention

The present invention relates to a method of manufacturing various kinds of link rods in use for a vehicle suspension or the like.

2. Description of the Related Art

There is publicly known a link rod which has a pipe-shaped arm portion and a bush mounting bracket being friction stir welded to an end of the arm portion. There is also publicly known the art wherein a small diameter portion is provided on a mounting projection integrally formed with a bracket, the small diameter portion is engaged with an end of the arm portion and the end of the arm portion comes into butt contact with the mounting projection so as to be friction stir welded along the butt contact portion. Further, there is publicly known the art wherein a material for the bracket is provided for making a plurality of brackets to be cut at a predetermined width in the longitudinal direction, an end of the arm portion is engaged with height difference with the bracket material to be sub-assembled, the sub-assembled arm portion is arranged in such a manner that the plurality of arm portions are arranged in a horizontal row along the longitudinal direction of the bracket material, the engaged portions with height difference are arranged in the shape of a straight line with respect to each of the arm portions so that fraction agitation joining is carried out at a time along the engaged portions with height difference, and thereafter link rods are formed by cutting the bracket material in a predetermined size of a product in the crossing direction thereof.

Patent reference 1: Japanese patent laid-open publication No. H11-101286

Patent reference 2: Japanese patent laid-open publication No. H11-190375

Patent reference 3: Japanese patent laid-open publication No. H11-099415.

When friction stir welding the bracket to the arm portion with a high degree of reliability, tool traveling surfaces in the vicinity of butt portions between both members must be formed in a plane without height difference because the joining with high reliability can not be obtained when friction stir welding the butt portions with height difference like the above-described prior art. Further, in the case where the friction stir welding is carried out from outside of a pipe member, it is required to keep flush without denting the pipe member by pressing the tool so as to obtain the friction stir welding with high reliability. Although these points can be solved by having the mounting projection of the bracket engaged with the arm portion so as to form a flush butt portion like the above-described prior art, it is required to make the small diameter portion each for one or two brackets with respect to one arm portion and to have it engaged with the arm portion, whereby production efficiency can not be improved.

SUMMARY OF THE INVENTION

Therefore, the present invention aims to provide the link rod manufacturing method capable of realizing the friction stir welding with high reliability and at the same time of improving the production efficiency.

To solve the above-described disadvantages, in accordance with a first aspect of the present invention, in a method of manufacturing a link rod comprising an arm portion having a longitudinally extending configuration, and a bracket for mounting a bush being joined to an end in the longitudinal direction of the arm portion, the arm portion has a pair of first and second walls parallel extending to each other and a third wall connecting between the first and second walls, the third wall is formed with a notch on an end in the longitudinal direction thereof, an engaging projection formed on the bush mounting bracket is engaged with the notch to support the first wall and the second wall, and each of ends in the longitudinal direction of the first and second walls is butted against the bush mounting bracket such that a wall of the bush mounting bracket is butted against each of the ends of the first and second walls so as to form a plane tool traveling surface, wherein the arm portion is joined to the bush mounting bracket by friction stir welding along the butt portion between each of the ends of the first and second walls and the bush mounting bracket.

In accordance with a second aspect of the present invention, more than one set of the arm portion and the bush mounting bracket being butted against each other is arranged in a horizontal row such that the butt portions between each of the arm portions and the bush mounting brackets extend continuously in the shape of a straight line, wherein the friction stir welding is continuously carried out in one process step along the continuously extending butt portions, and then neighboring sets of the arm portion and the bush mounting bracket are cut and separated into each of link rods.

In accordance with a third aspect of the present invention, a spacer is interposed between the neighboring sets of the arm portion and the bracket which are arranged in a horizontal row, so as to cross at a right angle a continuously extending line of the butt portions such that the butt portions extend continuously along the entire length thereof through the intermediary of the spacer and a surface of the spacer is made flush with surfaces of the arm portions positioned on each side thereof to form the tool traveling surface with a continuous plane along the entire length thereof, wherein the friction stir welding is carried out along the continuously extending butt portions including the spacer, and then the spacer is cut to have link rods separated from each other.

In accordance with a fourth aspect of the present invention, a method of manufacturing a link rod which comprises an arm portion having a longitudinally extending configuration, and a bush mounting bracket being joined to an end in the longitudinal direction of the arm portion, wherein the arm portion has a pair of first and second walls extending in parallel with each other and a third wall connecting between the first and second walls, comprises the steps of forming a notch by cutting out an end in the longitudinal direction of the third wall of the arm portion, extrusion molding a bracket material for forming a plurality of the bush mounting brackets by being cut in the longitudinal direction thereof, having an engaging projection which is integrally formed with the bracket material, engaged with the notch of the third wall provided on the longitudinal end of the arm portion, butting the longitudinal end of the arm portion against the bracket material such that a wall of the bracket material is butted against each of ends of the first and second walls to form a flush tool traveling surface, arranging in a horizontal row in the longitudinal direction of the bracket material a plurality of the arm portions in a butted state against the bracket material, such that the butt portions of the arm portions each are continuously formed in the shape of a straight line along the direction of the row, friction stir welding continuously each of the arm portions and the bracket material in one process step along the continuously formed butt portions, and cutting the bracket material at a predetermined width of a product in the longitudinal direction thereof to have link rods in a horizontal row separated into each link rod.

In accordance with the fifth aspect of the present invention, the method further comprises the steps of interposing a spacer into between the arm portions arranged in a horizontal row, in the direction crossing at a right angle an extension line of the butt portions such that the butt portions are formed continuously along the entire length thereof through the intermediary of the spacer by butting an end of the spacer against the bracket material and a surface of the spacer is made flush with surfaces positioned in the vicinity of the butt portions to form a tool traveling surface with a continuous plane along the entire length thereof, friction stir welding the arm portions and the bracket material along the butt portions including the spacer, and then cutting the bracket material together with the spacer.

In accordance with the sixth aspect of the present invention, in a method of manufacturing a link rod which comprises a longitudinally extending arm having a pair of first wall and second wall formed in parallel in a cross section crossing the longitudinal direction of the arm and a third wall connecting between the first and second walls, and a bush mounting bracket having a bush mounting hole and being integrally formed with an engaging projection to be engaged between the first and second walls on an longitudinal end of the arm, wherein the bush mounting bracket is friction stir welding to and formed integral with the longitudinal end of the arm, comprises the steps of forming a bracket material by carrying out extrusion molding such that a cross section of an extrusion has a configuration of a front view of the bush mounting bracket when viewed from an axial direction of the bush mounting hole and is formed integral with the engaging projection and then by cutting the extrusion in the longitudinal direction thereof at such a predetermined length that a plurality of the bush mounting brackets are arranged in a horizontal row, forming an arm material by carrying out extrusion molding such that a cross section of an extrusion corresponds to such a cross section, in the direction crossing at a right angle the longitudinal direction of the arm, that a plurality of the arms are arranged in a horizontal row, and such that the width of the extrusion corresponds to the cut length of the bracket material and then by cutting the extrusion in the longitudinal direction thereof at the predetermined length of the arm, notching each end in the longitudinal direction of the third wall with respect to the arm material to form a clearance in the case of having engaged with the engaging projection, arranging the bracket material and the arm material in such a state that the extrusion directions of these materials cross at right angle each other so as to engage the engaging projection integrally formed with the bracket material between the first and second walls on the end of the extrusion direction of the arm material, having the first and second walls butted against the bracket material to form a butt portion in the shape of a flush and continuous straight line, friction stir welding the arm material and the bracket material in one process step along the butt portion, and then cutting such joined materials at the width of a product in the direction crossing at right angle the extrusion direction of the arm material.

According to the first aspect of the present invention, the arm portion has the pair of first and second walls parallel extending to each other and the third wall connecting between the first and second walls. The third wall is formed with the notch on an end in the longitudinal direction thereof. The engaging projection formed on the bush mounting bracket is engaged with the notch to support the first wall and the second wall. Each of the ends in the longitudinal direction of the first and second walls is butted against the bush mounting bracket. The first and second walls and the bracket wall form a plane tool traveling surface in the vicinity of the butt portion. Therefore, when the friction stir welding is carried out along the butt portion, a rotation tool can travel on the plane tool traveling surface and a deformation of the tool traveling surface due to pressing by the rotation tool can be prevented by the support of the engaging projection, so that it is possible to realize the friction stir welding with high reliability in the manufacture of the link rod.

According to the second aspect of the present invention, more than one set of the arm portion and the bush mounting bracket being butted each other are arranged in a horizontal row such that each of the butt portions between the arm portions and the bush mounting brackets is continuously formed in the shape of a straight line. The friction stir welding is continuously carried out in one process step along the continuously formed butt portions. Then, neighboring sets are cut and separated into each of link rods. Therefore, the friction stir welding may be completed at a time, and portions to be cut are limited to only the joined portions between the neighboring sets in order to enable easy cutting, so that it is possible to efficiently manufacture a plurality of link rods at a time.

According to the third aspect of the present invention, a spacer is interposed between the neighboring sets. The spacer forms the entire length of the butt portions in the shape of a continuous straight line and the tool traveling surface also is formed with a continuous plane along the entire length thereof. Therefore, the friction stir welding can be carried out continuously together with the spacer. Further, only when cutting the spacer, each of the link rods can be cut, whereby it is possible to manufacture the products with high precision and high quality, without scraping partially the thickness of the arm portion.

According to the fourth aspect of the present invention, when the plurality of the arm portions are arranged in a horizontal row and sub-assembled with respect to the bracket material, the friction stir welding may be carried out in a continuous process, and the link rods may be separated simply by cutting the bracket material at the predetermined width in the longitudinal direction thereof, so as to further improve the production efficiency.

According to the fifth aspect of the present invention, by interposing the spacer between the neighboring arm portions, the spacer forms continuously the entire length of the butt portions in the shape of straight line and makes flush a tool traveling surface with a continuous plane along the entire length thereof. Therefore, the friction stir welding can be carried out continuously together with the spacer. Also, each of the link rods can be separated simply by cutting the spacer so that it is possible to efficiently manufacture the products with high precision and high quality, without scraping partially the thickness of the arm potion.

According to the sixth aspect of the present invention, the extrusion directions of the bracket material and the arm material, each being extrusion molded for the plurality of link rods, are arranged in such a manner that the extrusion direction of each material crosses at right angle each other so as to have the engaging projection integrally formed with the bracket material engaged between the first and second walls in the end of the extrusion direction of the arm material. The first and second walls and the bracket material are butted each other such that the butt portions are formed in the shape of a flush and continuous straight line so as to form a flush and plane continuous tool traveling surface along the butt portions. Then, the friction stir welding between the arm material and the bracket material is carried out at a time along the butt portions. Thereafter, the entire joined material is cut at the width of the product in the direction crossing at right angle the extrusion direction of the arm material. Therefore, the treatment and the positioning can be easily performed. Further, it is easy to form the flush and plane tool traveling surface continuously along the butt portions, whereby the friction stir welding can be easily carried out.

BRIEF DESCRIPTION OF THE DRAWINGS

FIGS. 1-A and 1-B are views showing a link rod for a suspension to be obtained by the present invention;

FIGS. 2-A and 2-B are views showing a sub-assembling state according to a first embodiment of the present invention:

FIGS. 3-A, 3-B and 3-C are views showing an arm portion according to the first embodiment;

DETAILED DESCRIPTION OF THE PREFERRED EMBODIMENTS

Figure 4:
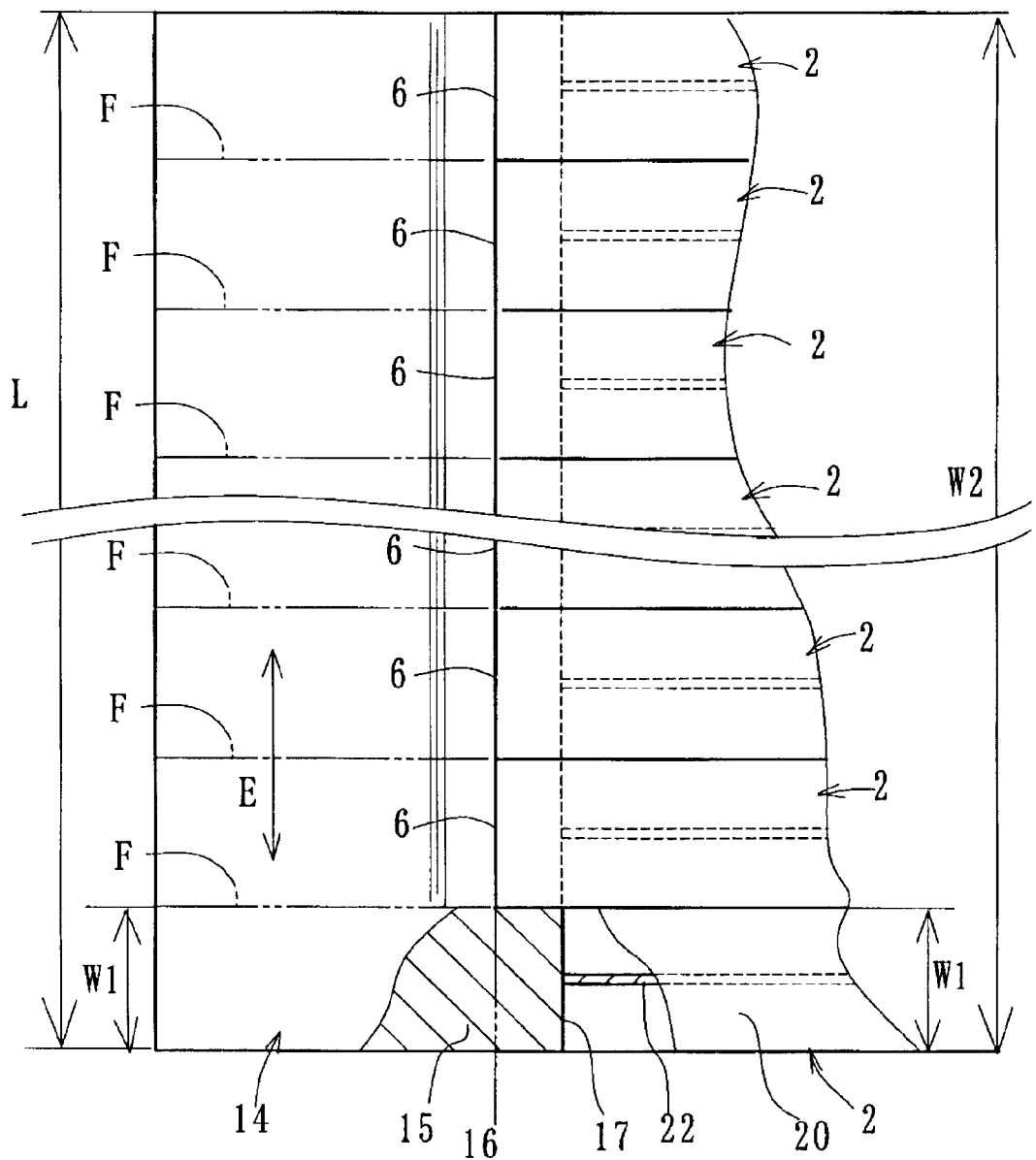
FIG. 4 is a top plan view showing an arrangement state in a horizontal row of the arm portions according to the first embodiment.

Hereinafter, the first embodiment of the present invention will be explained with reference to the accompanying drawings. FIGS. 1-A and 1-B show a link rod to be obtained by the present invention, wherein a view A is a front view and a view B is a plan view.

This link rod 1 has an arm portion 2 of substantially I-shaped configuration and a pair of brackets 4 which are joined to and integrated with each end in the longitudinal direction of the arm portion 2 and in each the brackets 4 a bush 3 is provided. In this example, although the left and right bushes 3 are formed identical, it is possible to freely vary the size, the material, etc. with respect to the right and the left bushes 3. The bracket 4 is a bush mounting bracket in this invention.

The bracket 4 has a cylindrical shape and is provided with a mounting projection 5 integrally projecting to the radially outward direction from a portion of an external periphery of the bracket 4. An end of the mounting projection 5 and an end of the arm portion 2 are butted each other to form a butt portion 6 and joined integral with each other by friction stir welding. An engaging projection 7 formed on a projecting side of the mounting projection 5 is press fitted into the end of the arm portion 2 in the vicinity of the butt portion 6.

On upper and lower surfaces of the engaging projection 7 there are formed a pair of steps 7a, 7a. The width in an upward and downward direction of the engaging projection 7 is narrower than the mounting projection 5 by the depth (t) of each step 7a, 7a. Each outer end of vertical walls 7b, 7b extending from ends of the steps 7a, 7a, corresponds to the butt portion 6.

The bush 3 provided on the inside of the bracket 4 comprises a rubber vibration isolator 8 and an inner tube 9 connected through the rubber vibration isolator 8 to the bracket 4. The bracket 4 and the inner tube 9 are substantially concentrically arranged. Herein, the structure of the bush 3 is optional. For example, the bush may be formed in a double tube type of inner and outer tubes capable of being press fitted into a ring portion of the bracket 4.

A manufacturing method of the first embodiment for manufacturing the link rod 1 will be explained with reference to FIGS. 2-6. FIGS. 2-A and 2-B are views for explaining a method of joining the end of the arm portion 2 to a bracket material 14 for forming the bracket 4, wherein a view A shows a state of sub-assembling operation and a view B shows a sub-assembling state at the time of friction stir welding. The bracket material 14 is made by extrusion molding light metal such as aluminum alloy, etc. or resin in the direction of an arrow E and by regular-size cutting the extrusion at a proper length corresponding to a plurality of brackets.

A cross section of the extrusion is the same as a configuration of the front view (FIG. 1-A) of the bracket 4 and is integrally formed with a ring-shaped portion and a mounting projection 15 which projects radially outwardly from a portion of the ring-shaped portion. This mounting projection 15 corresponds to the one obtained by continuously extruding the mounting projection 5 of the bracket 4 to the extruding direction E and is formed in the shape of projection continuing long in the extruding direction E. The extruding direction E is in coincidence with the direction of an imaginary center line of a bush mounting hole 4a formed in the bracket material 14.

On the mounting projection 15 there is integrally formed an engaging projection 17 on upper and lower walls of which steps 17a, 17a are formed. These engaging projection 17 and the steps 17a, 17a are formed continuously together with vertical walls 17b, 17b extending from each end of the steps 17a, 17a in the extruding direction E of the bracket material 14.

The arm portion 2 is made into substantially I-shaped cross section by extrusion molding and regular-size cutting a material, similar to the bracket material 14, and is obtained by previously cutting a extruded molding at a proper length. The end portion 2a of the arm portion 2 is engaged and sub-assembled with the mounting projection 15 and thereafter integrated with the mounting projection 15 by carrying out friction stir welding along the butt portions 6, as shown in FIG. 2-B, The arm portion 2 has a first wall 20, a second wall 21 and a third wall 22 so as to be formed into the substantially I-shaped cross section and is arranged in such a state that the longitudinal direction of the arm portion 2 crosses at right angle the longitudinal direction of the bracket material 14. Each end of the first wall 20 and the second wall 21 on the side of the end portion 2a is fitted on the step 7a and each end surface thereof is butted against the vertical wall 17b. The height H of the arm portion 2 is identical with the width H in the direction of height of the mounting projection 15.

The arm portion 2 has a first wall 20, a second wall 21 and a third wall 22 so as to be formed into the substantially I-shaped cross section and is arranged in such a state that the longitudinal direction of the arm portion 2 crosses at right angle the longitudinal direction of the bracket material 14. Each end of the first wall 20 and the second wall 21 on the side of the end portion 2a is fitted on the step 7a and each end surface thereof is butted against the vertical wall 17b. The height H of the arm portion 2 is identical with the width H in the direction of height of the mounting projection 15.

The views in FIG. 3 show a detail of the arm portion 2, wherein a view A is a partial front view, a view B is a cross sectional view and a view C is a partial front view after forming a notch, respectively. As apparently shown in these figures, the arm portion 2 comprises the first wall 20, the second wall 21, each parallel extending in a pair on upper and lower sides thereof, and the third uprightly extending wall 22 which crosses at a right angle and connects the first and second walls 20, 21. These walls are integrated with one another.

After the arm portion 2 is extrusion molded in the longitudinal direction thereof and cut in a predetermined size, an end of the third wall 22 on the side of the end portion 2a is cut out to form a notch 23 with which the engaging projection 17 is engaged. The thickness of each of the first wall 20 and the second wall 21 is (t) and identical with the depth of the step 17a (see FIG. 1-A).

FIG. 4 is a top plan view showing an arrangement state of the arm portions 2 in a horizontal row. A plurality of the arm portions 2 are arranged in a horizontal row without clearance in the extruding direction of the bracket material 14. Given that the length of the bracket material is L and the width of the arm portion 2 is W1, the width W2 of the entire arrangement in the case of arranging N pieces of the arm portion 2 in a horizontal row is W1×N, which is set to be identical with the length L of the bracket material 14.

Each end on the other side of the longitudinal direction of the arm portions 2 is similarly is butted against the bracket material 14. In such formed sub-assembled state, the butt portions 6 of each arm portion 2 extend continuously in a straight line which overlaps a joining line 16 of an imaginary straight line. Then, the friction stir welding is carried out in one process step continuously along the butt portions 6.

Figure 5:
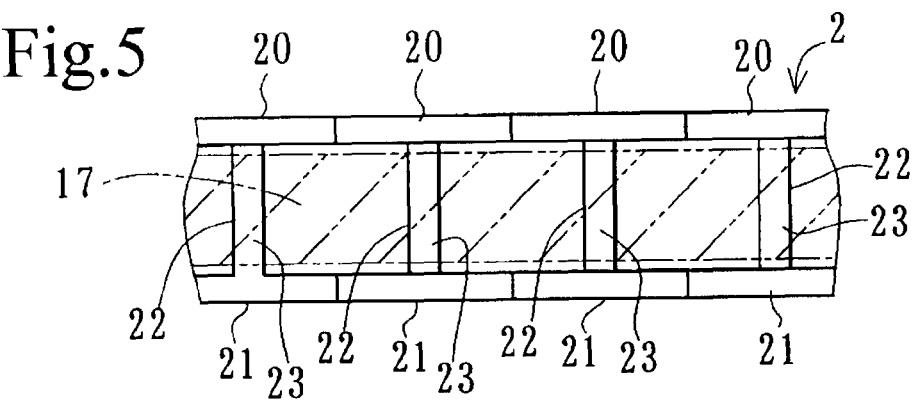
FIG. 5 is a view showing ends of the arm portions in sub-assembled states thereof according to the first embodiment.

FIG. 5 is a view showing the longitudinal ends of the arm portions 2 arranged in a horizontal row, viewed from the butted side. As clearly shown in this drawing, the first walls 20 and the second walls 21 extend continuously in the left and right direction of the drawing, keeping a space in the upward and downward direction through the intermediary of the third wall 22s. Also, since the notches 23 of the third walls 22 are arranged at the same heights in a horizontal row at intervals in the left and right direction of the drawing, the engaging projection 17 which extends continuously in the left and right direction of the drawing is engaged between the first walls 20 and the second walls 21.

Figure 8:
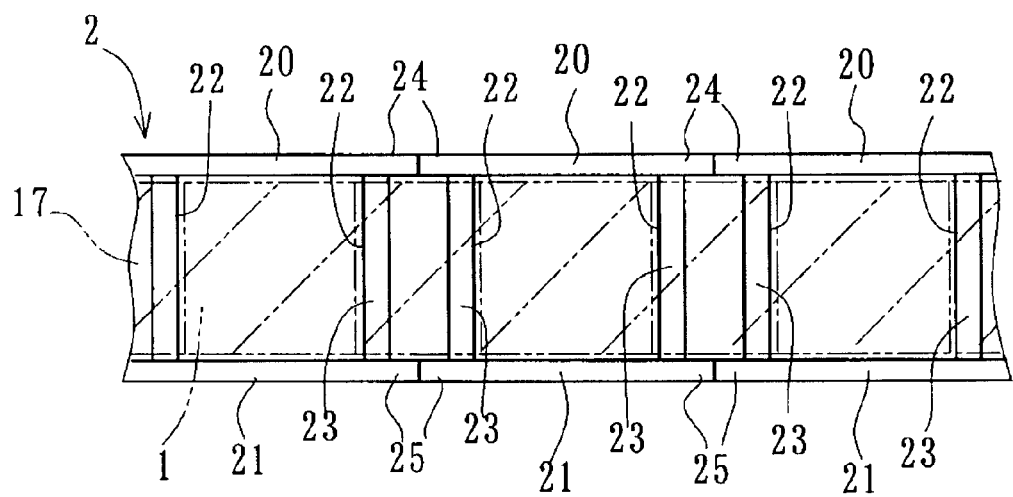
FIG. 8 is a view corresponding to FIG. 5, according to the second embodiment.
Figure 11:
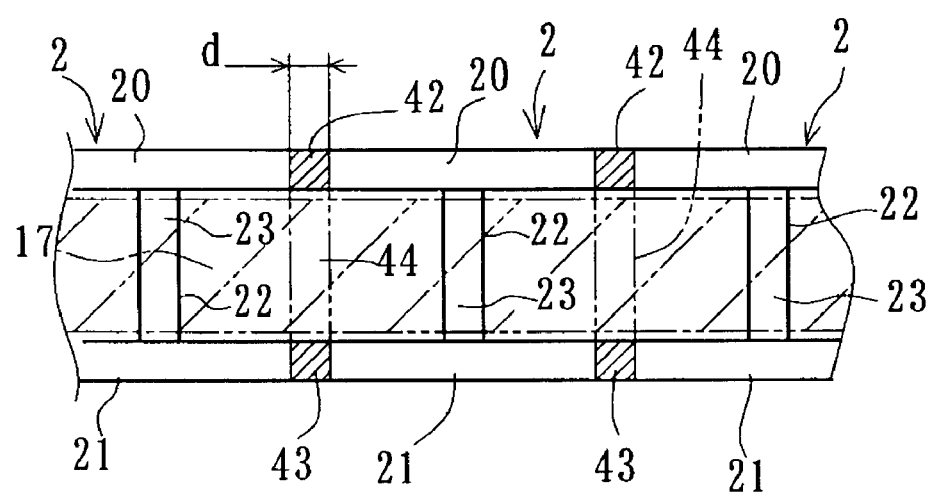
FIG. 11 is a view corresponding to FIG. 5, according to the third embodiment.

Herein, although in the drawing the engaging projection 17 is depicted at a little space from the first walls 20 and the second walls 21, it is for convenience in representation and actually the engaging projection 17 is in such a tightly contacted state as to overlap the first walls 20 and the second walls 21 (ditto in FIG. 8 and FIG. 11).

Figure 6:
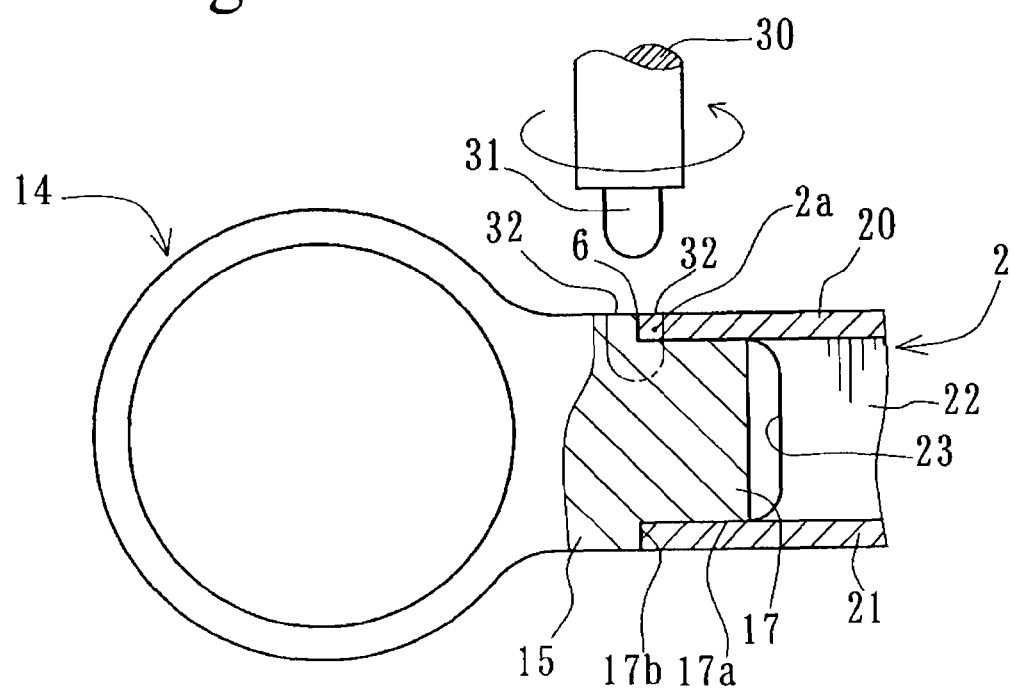
FIG. 6 is a view showing a state of friction stir welding operation according to the first embodiment.

FIG. 6 is a view showing a state of the friction stir welding. The friction stir welding is carried out in such a publicly known manner that a probe 31 of a high speed rotation tool 30 is pressed on and penetrated into the butt portion 6 to friction stir weld each of the materials. Thus, each of the materials is integrated with each other.

Then, since a tool traveling surface 32 being formed by surfaces of the mounting projection 15 and the end portions 2a while putting the butt portions 6 between these surfaces is flush without height difference, the friction stir welding by the rotation tool 30 can be carried out with high reliability. Further, since the butt portions 6 are formed continuously in the shape of a straight line along the entire length of the arm portions 2 arranged in a horizontal row, the entire arm potions 2 are joined to and integrated with the mounting projection 15 by letting the rotation tool 30 travel along the joining line 16 (see FIG. 4).

Furthermore, since the engaging projection 17 is engaged in the notch 23 formed on the third wall 22 on the side of the end portion 2a, even if the rotation tool 30 is fully pressed on the end portion 2a, the engaging projection 17 supports the end portions 2a from the inside thereof so that the end portion 2a is prevented from denting downward. Thereby, the stable friction stir welding by the rotation tool 30 can be carried out with high reliability.

When the friction stir welding is performed like the above-mentioned manner, the bracket material 14 and each of the arm portions 2 are joined and integrated together on the butt portions 6. Then, the bracket material 14 is cut along cutting lines F (corresponding to the extension of a boundary line between the neighboring arm portions 2) shown by imaginary lines in FIG. 2 and FIG. 4, so as to be separated into each link rod.

Thereby, a plurality of link rods can be manufactured substantially at the same time by the friction stir welding which enables the joining of the plurality of the arm portions 2 to the bracket material 14 at a time and by such a comparatively light work as cuts the bracket material 14 after the friction stir welding, so that the production efficiency may be improved.

Figure 7:
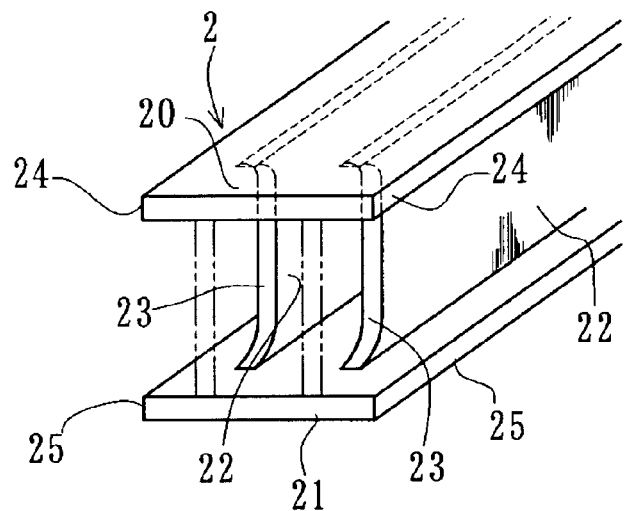
FIG. 7 is a perspective view of the arm portion according to a second embodiment.

FIG. 7 and FIG. 8 show a second embodiment. This embodiment is different from the first one merely in that the arm portion 2 is not formed in I-shaped cross section but it is formed substantially in the shape of square pipe by providing a pair of third walls 22 which extends in parallel with a predetermined space in the width direction of the arm portion 2 (the left and right direction in the drawing). This arm portion 2 is obtained similarly by extrusion molding a proper material such as aluminum ally, etc. or resin in the longitudinal direction thereof and cutting the extrusion in a predetermined size. As shown FIG. 7, notches 23 are formed each on ends of the pair of the third walls 22.

FIG. 8 which corresponds to FIG. 5 shows end surfaces of the arm portions 2 in a state arranged in row. As apparently shown in this drawing, the first wall 20 and the second wall 21 have flanges 24, 25 protruding to each side of the width direction thereof. The flanges 24, 25 are connected each to the neighboring ones. With this construction, as with the former embodiment, it is possible to realize the friction stir welding with high reliability and the link rod manufacture with high production efficiency. Further, the support rigidity for the first wall 20 and the second wall 21 on the upper and the lower sides is enhanced, whereby the deformation of the tool traveling surface at the time of friction stir welding is more prevented.

Figure 9:
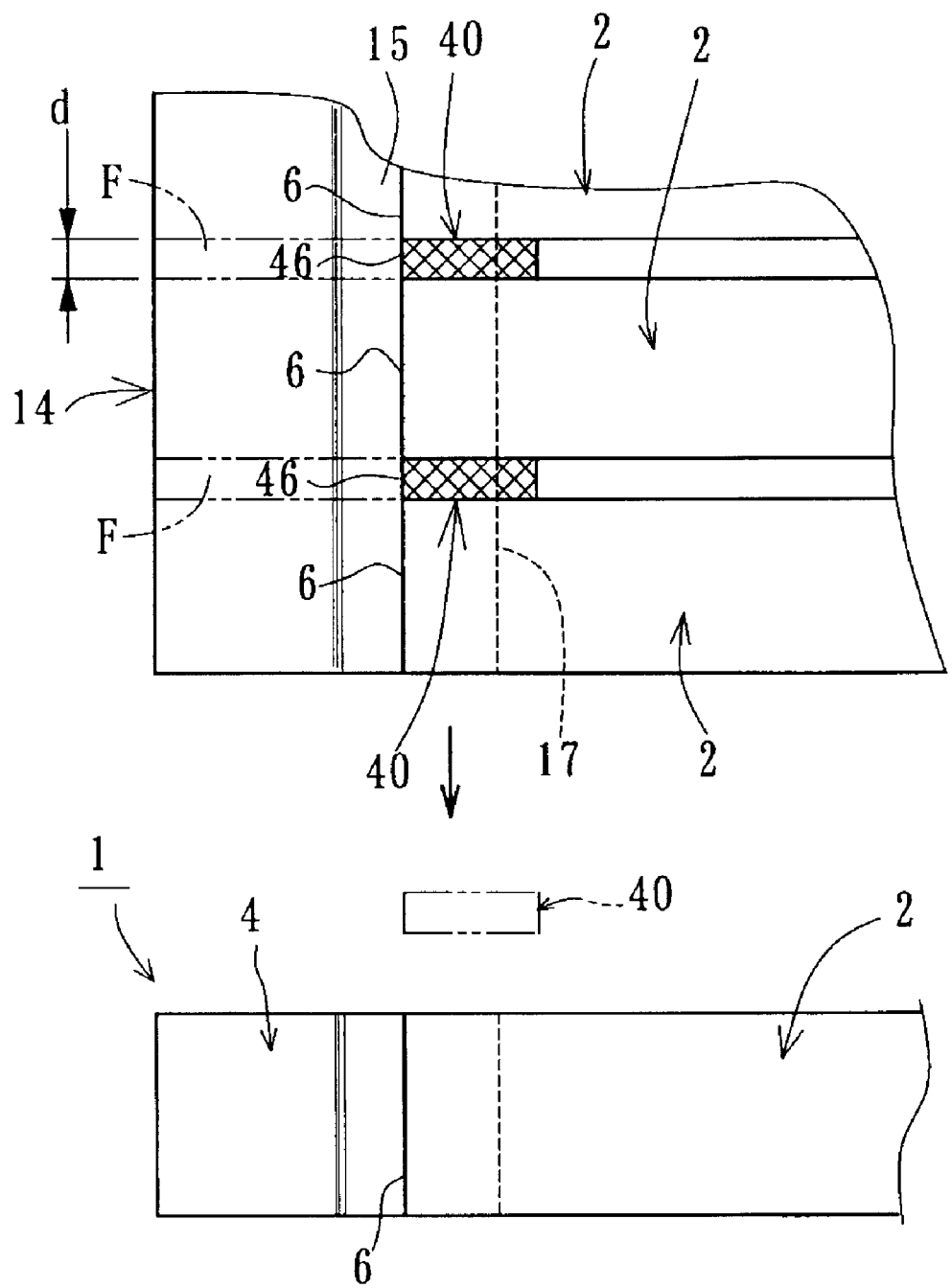
FIG. 9 is a view corresponding to FIG. 4, according to a third embodiment.
Figure 10:
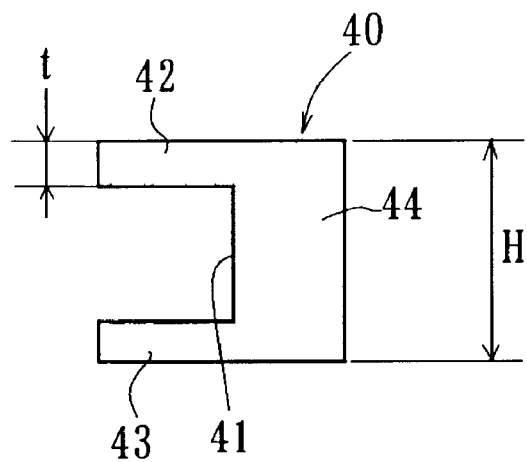
FIG. 10 is a view showing a spacer according to the third embodiment.

FIGS. 9-11 show a third embodiment. This embodiment is different from each of the preceding embodiments in that a spacer 40 is provided. This spacer 40 may be applied to either of the first and the second embodiments. In this embodiment, there is shown an example applied to the first embodiment.

FIG. 9 is a top plan view of a sub-assembled state corresponding to FIG. 4, wherein the spacer 40 marked with cross-hatching is interposed between the neighboring arm portions 2. The spacer 40 butts an end thereof against a portion forming the butt portion 6 of the mounting projection 15 to form a butt portion 46. An outer surface of the spacer 40 is made flush with surfaces of the arm portion 2 and the mounting projection 15 arranged on each side thereof to form a flush tool traveling surface. Each of the butt portions 6 is connected continuously to the butt portion 46 between the spacer 40 and the mounting projection 15 so that these butt portions 6 and 46 form a continuous straight line along the entire length thereof.

FIG. 10 shows the spacer 40. The spacer 40 is made of the same material as the arm portion 2 and formed in a substantially U-shape configuration to be engaged with the engaging projection 17. Namely, the spacer 40 comprises a notch 41 corresponding to the notch 23, an upper wall 42 and a lower wall 43 each to be fitted onto the steps 7a, 7a on the upper and lower sides thereof, and a connecting portion 44 for connecting the upper and the lower walls 42, 43. The thickness of each of the upper wall 42 and the lower wall 43 is (t) and the height of the connecting portion 44 is H.

FIG. 11 is a view corresponding to FIG. 5, wherein the first wall 20 and the second wall 21 of the arm portion 2 are connected through the intermediary of the spacer 40 marked with cross-hatching each to the neighboring ones so as to form a continuous wall in the left and right direction of the drawing. The engaging projection 17 which is continuously formed in the left and right direction of the drawing is engaged between the first walls 20 and the second walls 21 and also engaged in the notch 23 of the third wall 22.

In the sub-assembled state that the spacer 40 is interposed as above, the friction stir welding is carried out as similarly as mentioned hereinabove, and thereafter as shown in a lower view of FIG. 9, the bracket material 14 including portions of the spacers 40 is cut at the width (d) of the spacer 40 in the transverse direction thereof so as to cut off the spacers 40 so that link rods are separated into each link rod.

Like the above mentioned manner, it is possible to obtain each of the link rods only by cutting off the spacer 40. Therefore, it is not required to cut off partially the ends in the width direction of the first wall 20 and the second wall 21, so that the link rod may be manufactured with precise dimensions. Herein, if the width (d) of the spacer 40 is set to be identical with the width of the cutting tool, it is possible to cut off the spacer 40 completely at one cutting process step. In the drawing (see FIG. 9), each cutting line F is shown to be identical with the width of the cutting tool.

Figure 12:
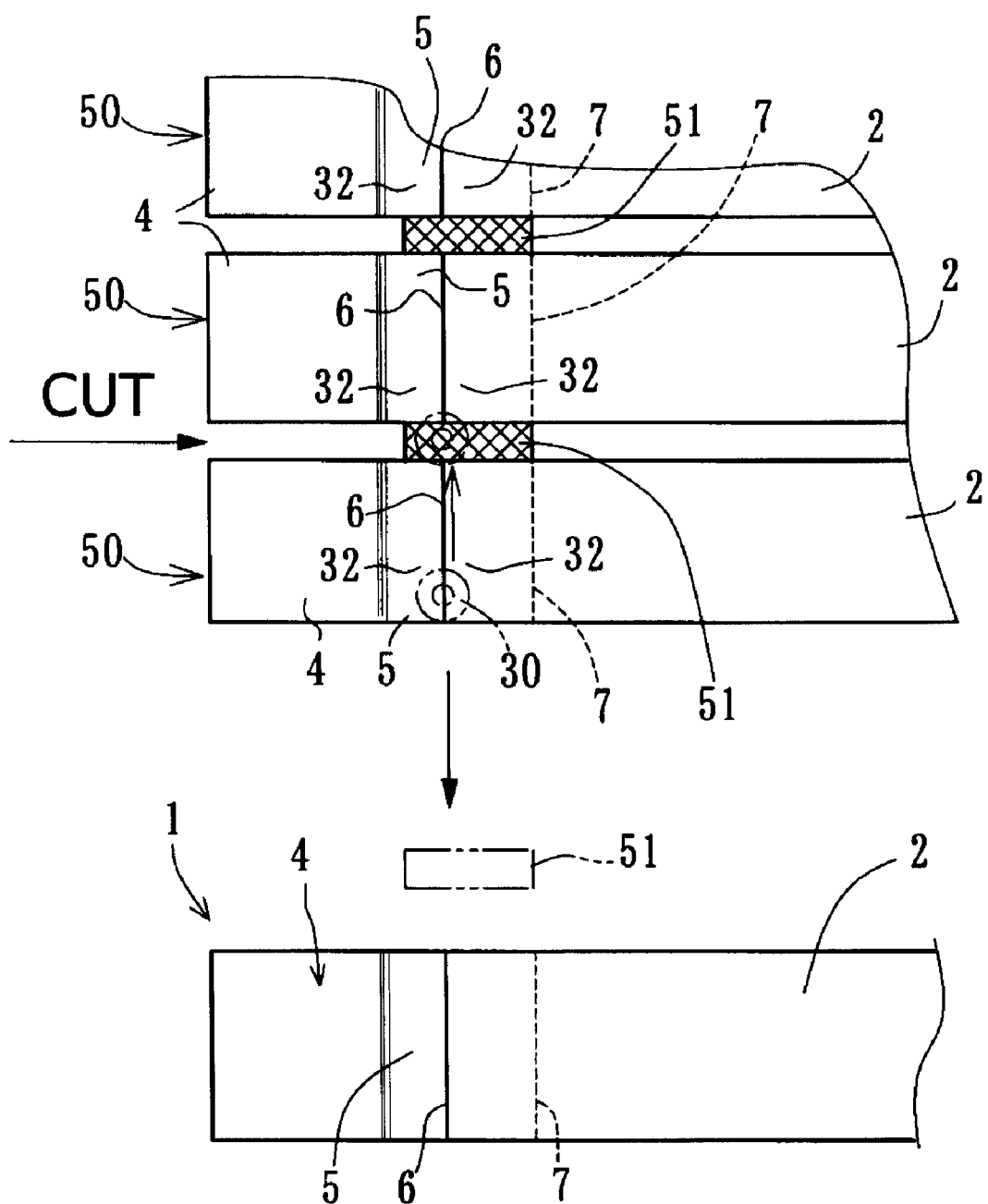
FIG. 12 is a view corresponding to FIG. 9, according to a fourth embodiment.

Further, in the third embodiment as shown in FIG. 9 to FIG. 11, instead of the bracket material 14, brackets 4 which are previously cut in regular sizes may be employed, for example, as shown in FIG. 12.

FIG. 12 is a view corresponding to FIG. 9 and showing a fourth embodiment. In this drawing, the bracket 4 and the end of the arm portion are butted each other and engaged with each other to form a set 50 of the bracket 4 and the arm portion 2. A plurality of sets 50 are arranged in row and spacers 51 are interposed between the neighboring sets 50 such that all of the sets 50 including spacers 51 are friction stir welded.

Figure 13:
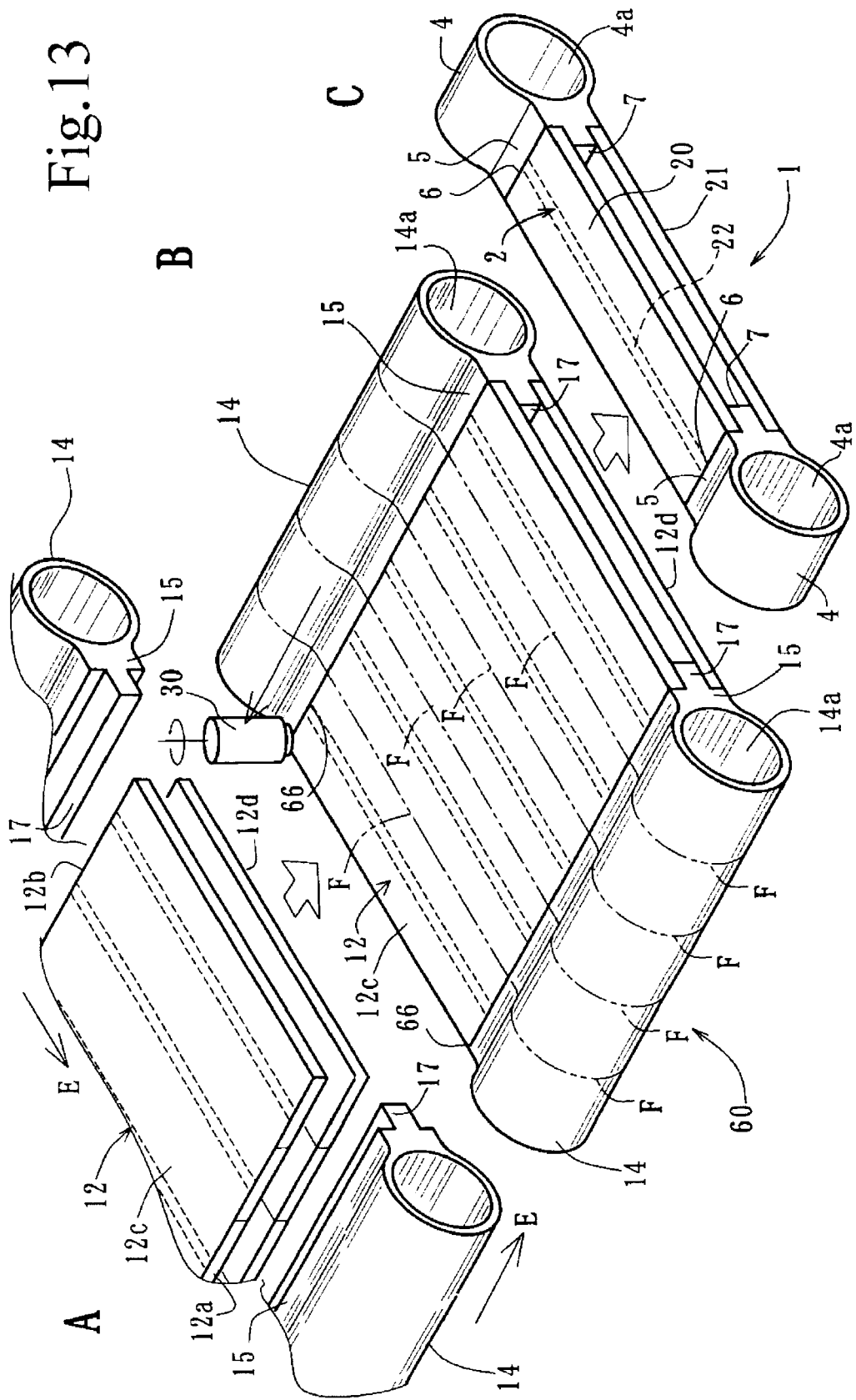
FIGS. 13-A, 13-B and 13-C are views schematically showing an entire process according to a fifth embodiment.

In this case, each of the spacers 51 is arranged to cross an extension line of the butt portions 6 of the neighboring sets 50 and each surface of the spacer 51 is made flush with a tool traveling surface 32 in the vicinity of the butt portions 6. With this construction, the tool is able to travel transversely all the sets 50 including the spacers 51 whereby friction stir welding can be carried out at a time with respect to all of the sets 50. Then, if the spacers 51 are cut off, each of link rods can be separated each other as shown in a lower view of FIG. 12. Thus, the length of cutting is further shortened, so that the production efficiency may be improved. FIGS. 13-16 show a fifth embodiment. FIG. 13 is a view for schematically explaining an entire method of manufacturing a link rod 1. In the drawing, a view A shows a process of butting each end of left and right mounting projections 15 provided on left and right bracket materials 14 against both ends 12a, 12b of an arm material 12, after extrusion molding the left and the right bracket materials 14 and the arm material 12. The bracket material 14 is substantially the same as the one shown in each of the above embodiments. 14a denotes an integrally formed bush mounting hole.

FIGS. 13-16 show a fifth embodiment. FIG. 13 is a view for schematically explaining an entire method of manufacturing a link rod 1. In the drawing, a view A shows a process of butting each end of left and right mounting projections 15 provided on left and right bracket materials 14 against both ends 12a, 12b of an arm material 12, after extrusion molding the left and the right bracket materials 14 and the arm material 12. The bracket material 14 is substantially the same as the one shown in each of the above embodiments. 14a denotes an integrally formed bush mounting hole.

A view B shows a process of friction stir welding. In the drawing, the left and the right bracket materials 14 and the arm material 12 are sub-assembled to form a sub-assembled body 60 in such a manner that the mounting projections 15 of the left and the right bracket materials 14 are butted against both ends 12a, 12b of the arm material 12 while having the engaging projections 17 engaged into both ends 12a, 12b of the arm material 12. The friction stir welding is carried out by letting a rotation tool 30 travel along a butt line 66 between the arm material 12 and the mounting projections 15 so that the arm material 12 and the mounting projections 15 are joined and integrated together.

Thereafter, by cutting the sub-assembled body 60 at the width of the product along cutting lines F, a link rod 1 as shown in a view C is obtained. The view C shows in perspective the link rod 1 which is separated and finished. 4a denotes a bush mounting hole. This link rod 1 is the same as the one shown in FIG. 1. Therefore, the reference characters in the first embodiment are commonly used with respect to the link rod 1 as a product shown in the view C.

Figure 14:
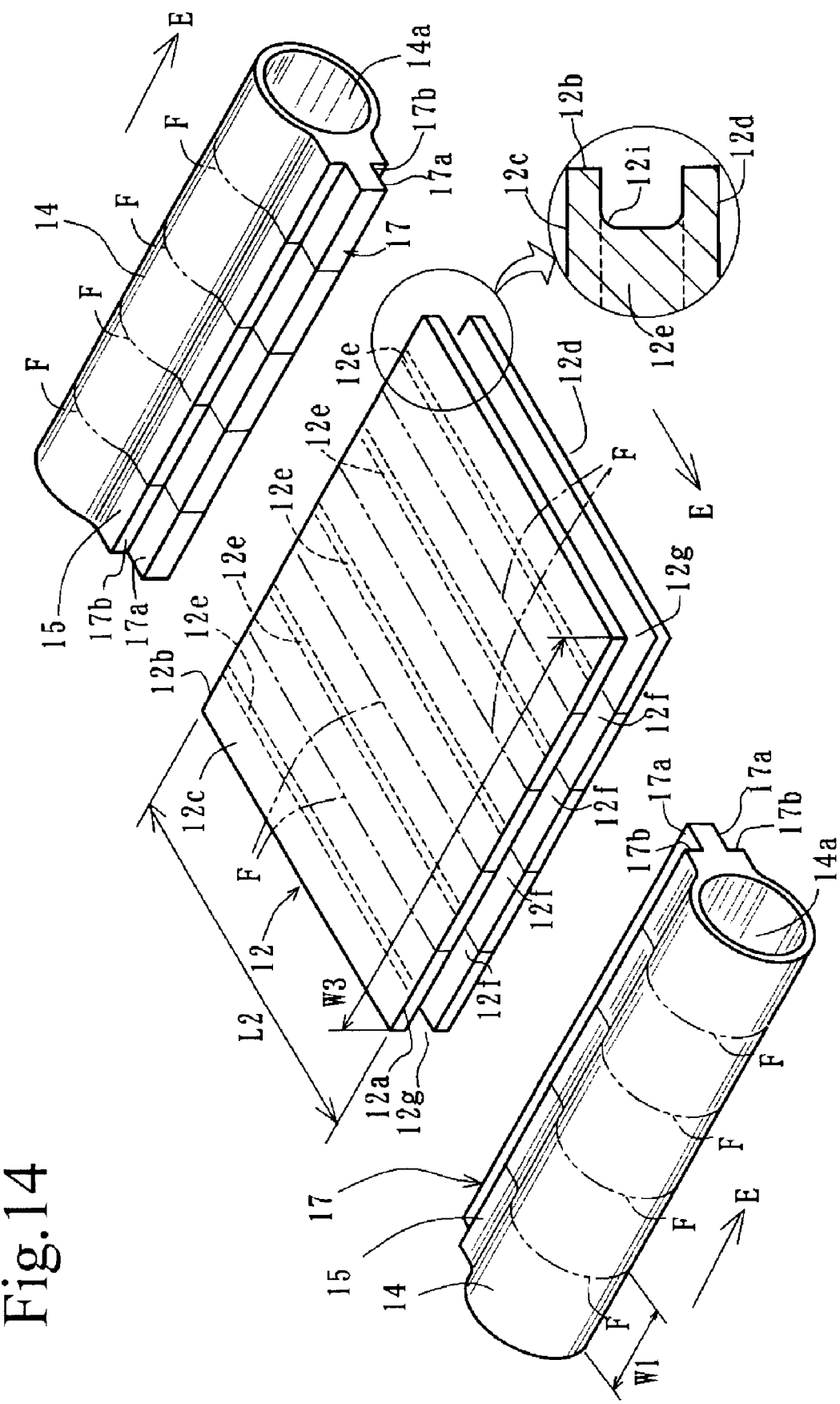
FIG. 14 is a view showing a sub-assembling method according to the fifth embodiment.

FIG. 14 is a view showing details of the process shown in FIG. 13-A. The arm material 12 is obtained by extrusion molding light metal such as aluminum ally, etc. or resin in the direction of the arrow E such that the width of the extrusion corresponds to the one obtained by arranging in a horizontal row a plurality of arm portions 2 (in this example, 5 pieces) as shown in FIG. 13 and by regular-size cutting the extrusion at the length L2 of the arm portion 2. The width W3 of the extrusion is W1×5 (pieces) wherein W1 is the width of a product, and it corresponds to W2 of FIG. 4.

The arm material 12 has a first wall 12c, a second wall 12d and third walls 12e of substantially rib shape which cross at right angles the first and second walls 12c, 12d. The first and second walls 12c, 12d extend in parallel with each other while having the third walls 12e arranged between them. The third walls 12e extend along the entire length in the direction of extrusion and are formed with five pieces at regular intervals in the width direction of extrusion. These three walls are formed integral with each other. Between the neighboring third walls 12e there are formed hollow portions 12f which pass through the arm material 12 in the direction of extrusion. On each end in the width direction of extrusion there is provided a groove 12g which is opened laterally.

On both ends in the longitudinal direction (the direction of extrusion) of the third walls 12e, as shown in enlarged cross section in the drawing, there are provided notches 12i which are formed by machining or the like after cutting in regular size the arm material 12. The engaging projections 17 are possible to be engaged with the notches 12j on both sides in the direction of extrusion of the arm material 12.

The materials 14 for bracket, substantially the same as the one mentioned hereinbefore, are obtained by being extrusion molded and then by being regular-size cut at the length W1×5, wherein W1 is the width of a product. This length is equal to L of FIG. 4 and substantially identical to the width W3 of extrusion of the material 12 for arm. As in the first embodiment, when the engaging projections 17 are engaged, vertical walls 17b of the mounting projections 15 are butted against end surfaces on both ends of the arm material 12. The arm material 12 and the bracket materials 14 are butted each other such that the direction E of extrusion of the arm material 12 crosses at a right angle the direction E of extrusion of the bracket materials 14.

Figure 15:
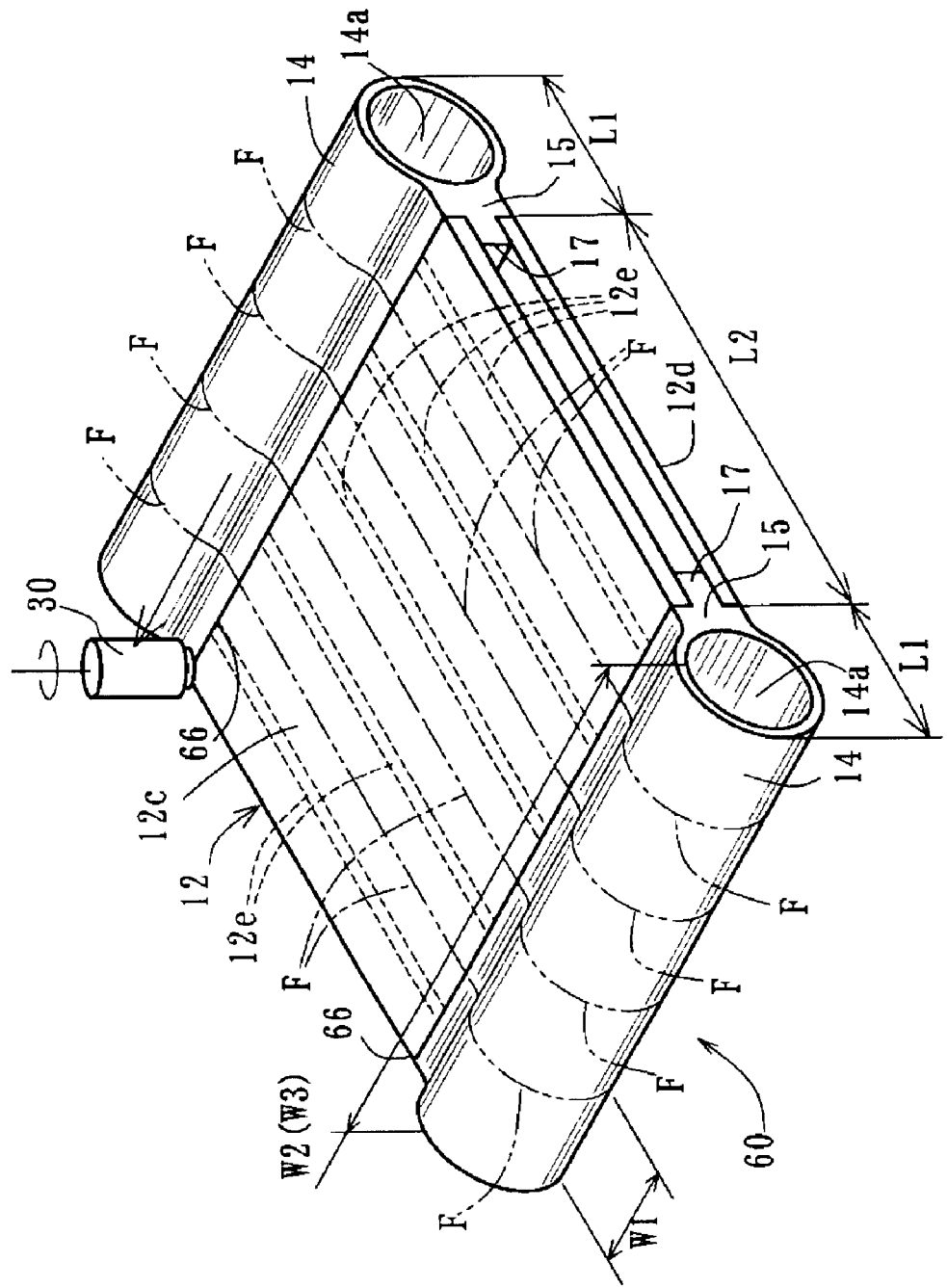
FIG. 15 is a view showing a state of friction stir welding operation according to the fifth embodiment.

FIG. 15 is a view showing in enlarged scale the process B shown in FIG. 13. Since this sub-assembled body 60 has the friction stir welding line (the butt line) 66 which is formed in the shape of continuous straight line, the friction stir welding can be smoothly carried out on this line in one continuous process step. The process of friction stir welding is performed in a similar manner as in FIG. 6.

Thereafter, the entire length of the sub-assembled body 60 is cut in the direction of extrusion of the arm material 12 along the cutting lines F passing the intermediate point of the neighboring third walls 12e, 12e with a proper cutter such as a band saw or the like so as to separate the neighboring link rods 1 (see FIG. 13) from each other. The cutting length at this time is L1 (the length of the bracket 4)×2+L2 (the length of the arm portion 2).

Figure 16:
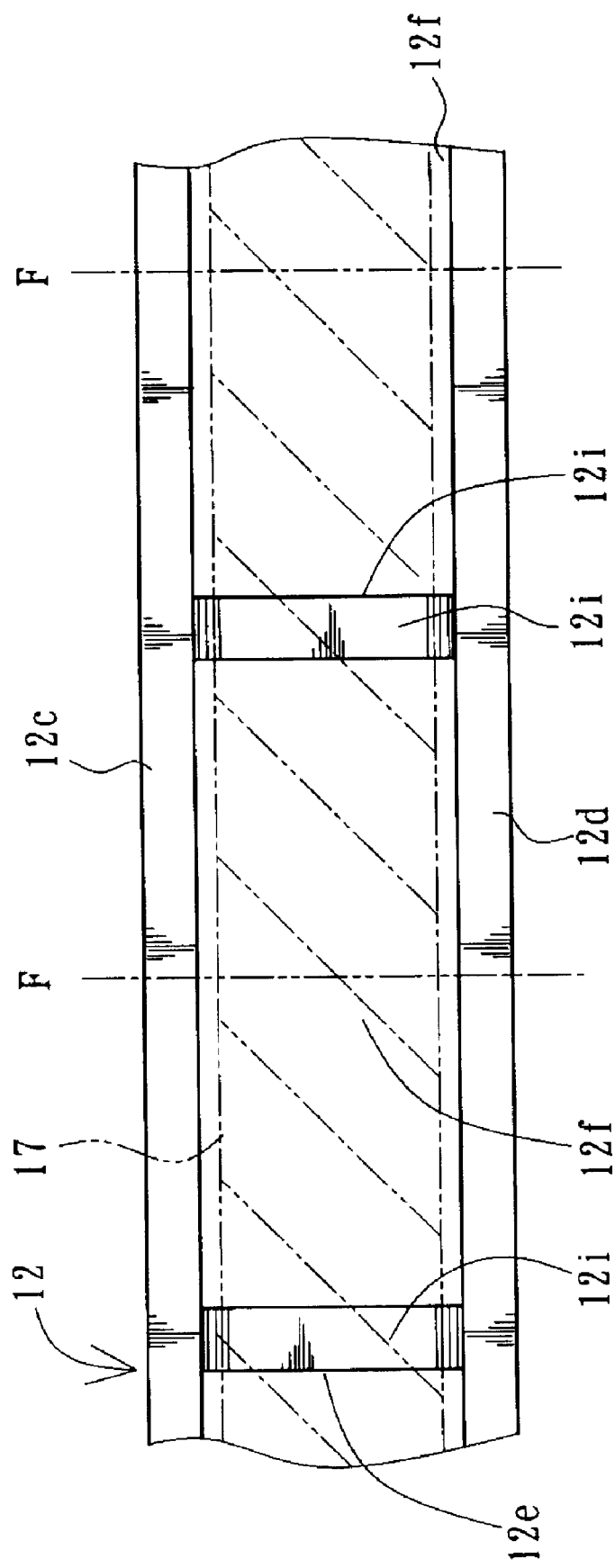
FIG. 16 is a view showing an end surface structure of an arm material according to the fifth embodiment.

FIG. 16 is a view showing the end of the arm material 12 viewed from the direction of extrusion. Each of the engaging projections 17 is engaged between the first wall 12c and the second wall 12d. Each of the hollow portions 12f has a horizontally extending rectangular shape in a state shown in the drawing. F is the cutting line. After the process step of friction stir welding, the intermediate point between the neighboring third walls 12e is cut along the cutting line F.

As explained herein, it is possible to easily and efficiently manufacture the bracket materials 14 and the arm material 12 for a plurality of link rods by extrusion molding. Also, since it is possible to carry out manufacture using only these three members without a spacer, the treatment and the positioning can be facilitated. In the process step of friction stir welding the same effects as in each of the preceding embodiments can be obtained.

While the present invention has been described in its preferred embodiments, it is to be understood that the invention is not limited to each of the embodiments but may be otherwise variously modified and changed within the true scope and spirit of the invention. For example, the link rod can be applied to various devices for vehicle such as a suspension, an engine mount, etc. Further, the arm portion may be formed by a simple square pipe. Furthermore, in the case of friction stir welding the back side of the sub-assembled body in the drawing, the whole of the sub-assembled body is turned over in a state butting the arm portions 2 or the arm material 12 to the bracket 4 or the bracket materials 14, so that the back side may be friction stir welded in one process step in the same manner as the front side.

DESCRIPTION OF REFERENCE CHARACTERS

1: Link rod, 2: Arm portion, 3: Bush, 4: Bracket, 5: Mounting projection, 6: Butt portion, 7: Engaging projection, 14: Bracket material, 15: Mounting projection, 20: First wall, 21: Second wall, 22: Third wall, 23: Notch, 30: Rotation tool, 31: Probe, 32: Tool traveling surface, 40: Spacer, 50: Set of arm portion and bracket

What is claimed is:

1. A method of manufacturing a link rod which comprises an arm portion having a longitudinally extending configuration, and a bracket for mounting a bush being joined to an end in the longitudinal direction of said arm portion, wherein said arm portion has a pair of first and second walls parallel extending to each other and a third wall connecting between said first wall and said second wall, comprising the steps of forming a notch on an end of said third wall in the longitudinal direction thereof, forming an engaging projection on said bush mounting bracket, engaging said engaging projection with said notch to support said first and second walls, butting each of ends in the longitudinal direction of said first and second walls against said bush mounting bracket such that a wall of said bush mounting bracket is butted against each of the ends of said first and second walls so as to form a plane tool traveling surface, and joining said arm portion to said bush mounting bracket by friction stir welding along the butt portion between each of the ends of said first and second walls and said bush mounting bracket.

2. The link rod manufacturing method according to claim 1, wherein more than one set of said arm portion and said bush mounting bracket being butted against each other is arranged in a horizontal row such that said butt portions between said arm portions and said bush mounting brackets extend continuously in the shape of a straight line, and wherein the friction stir welding is continuously carried out in one process step along said continuously extending butt portions, and then joined portions between neighboring sets of said arm portion and said bush mounting bracket are cut to be separated into each of link rods.

3. The link rod manufacturing method according to claim 2, wherein a spacer is interposed between said neighboring sets of said arm portion and said bracket which are arranged in a horizontal row, so as to cross at a right angle a continuously extending line of said butt portions such that said butt portions extend continuously along the entire length thereof through the intermediary of said spacer and such that a surface of said spacer is made flush with surfaces of said arm portions positioned on each side thereof to form the tool traveling surface with a continuous plane along the entire length thereof, wherein the friction stir welding is carried out along said continuously extending butt portions including said spacer, and then said spacer is cut to have link rods separated from each other.

4. A method of manufacturing a link rod which comprises an arm portion having a longitudinally extending configuration, and a bush mounting bracket being joined to an end in the longitudinal direction of said arm portion, wherein said arm portion has a pair of first and second walls extending in parallel with each other and a third wall connecting between said first and second walls, comprising the steps of forming a notch by cutting out an end in the longitudinal direction of said third wall of said arm portion, extrusion molding a bracket material for forming a plurality of said bush mounting brackets by being cut in the longitudinal direction thereof, having an engaging projection which is integrally formed with said bracket material, engaged with said notch of said third wall provided on the longitudinal end of said arm portion, butting the longitudinal end of said arm portion against said bracket material such that a wall of said bracket material is butted against each of ends of said first and second walls to form a flush tool traveling surface, arranging in a horizontal row in the longitudinal direction of said bracket material a plurality of said arm portions in a butted state against said bracket material, such that butt portions of said arm portions each are continuously formed in the shape of a straight line along the direction of the row, friction stir welding continuously each of said arm portions and said bracket material in one process step along said continuously formed butt portions, and cutting said bracket material at a predetermined width of a product in the longitudinal direction thereof to have link rods in a horizontal row separated into each link rod.

5. The link rod manufacturing method according to claim 4, further comprising the steps of interposing a spacer into between said arm portions arranged in a horizontal row, in the direction crossing at a right angle an extension line of said butt portions such that said butt portions are formed continuously along the entire length thereof through the intermediary of said spacer by butting an end of said spacer against said bracket material and a surface of said spacer is made flush with surfaces positioned in the vicinity of said butt portions to form a tool traveling surface with a continuous plane along the entire length thereof, friction stir welding said arm portions and said bracket material along said butt portions including said spacer, and then cutting said bracket material together with said spacer.

6. A method of manufacturing a link rod which comprises a longitudinally extending arm having a pair of first and second walls being formed in parallel in a cross section crossing at right angles the longitudinal direction of the arm and a third wall connecting between said first and second walls, and a bush mounting bracket having a bush mounting hole and being integrally formed with an engaging projection to be engaged between said first and second walls on an longitudinal end of said arm, wherein said bush mounting bracket is friction stir welded to and formed integral with the longitudinal end of said arm, comprises the steps of forming a bracket material by carrying out extrusion molding such that a cross section of an extrusion has a configuration of a front view of said bush mounting bracket when viewed from an axial direction of said bush mounting hole and is formed integral with said engaging projection and then by cutting the extrusion in the longitudinal direction thereof at such a predetermined length that a plurality of said bush mounting brackets are arranged in a horizontal row, forming an arm material by carrying out extrusion molding such that a cross section of an extrusion corresponds to such a cross section in the direction crossing at a right angle the longitudinal direction of said arm, that a plurality of said arms are arranged in a horizontal row, and such that the width of the extrusion corresponds to the cut length of said bracket material and then by cutting the extrusion in the longitudinal direction thereof at the predetermined length of said arm, notching each end in the longitudinal direction of said third wall with respect to said arm material to form a clearance in the case of having engaged with said engaging projection, arranging said bracket material and said arm material in such a state that the extrusion directions of these materials cross at right angle each other, so as to engage said engaging projection integrally formed with said bracket material between said first and second walls on the end of the extrusion direction of said arm material, having said first and second walls butted against said bracket material to form a butt portion in the shape of a flush and continuous straight line, friction stir welding said arm material and said bracket material in one process step along said butt portion, and then cutting such joined materials at the width of a product in the direction crossing at right angle the extrusion direction of said arm material.

* * * * *